US008566296B2

(12) United States Patent
Yalamanchi

(10) Patent No.: US 8,566,296 B2
(45) Date of Patent: Oct. 22, 2013

(54) SUPPORT FOR COMPENSATION AWARE DATA TYPES IN RELATIONAL DATABASE SYSTEMS

(75) Inventor: Aravind Yalamanchi, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 478 days.

(21) Appl. No.: 12/270,790

(22) Filed: Nov. 13, 2008

(65) Prior Publication Data

US 2009/0094291 A1  Apr. 9, 2009

Related U.S. Application Data

(63) Continuation-in-part of application No. 12/102,831, filed on Apr. 14, 2008, now Pat. No. 7,904,434.

(60) Provisional application No. 60/972,557, filed on Sep. 14, 2007.

(51) Int. Cl.
  *G06F 7/00* (2006.01)
  *G06F 15/18* (2006.01)

(52) U.S. Cl.
  USPC .............................................. 707/703; 706/12

(58) Field of Classification Search
  None
  See application file for complete search history.

(56) References Cited

U.S. PATENT DOCUMENTS

| 5,287,501 | A |   | 2/1994  | Lomet |
| 5,701,480 | A |   | 12/1997 | Raz |
| 5,745,904 | A | * | 4/1998  | King et al. ..................... 707/696 |
| 5,806,074 | A | * | 9/1998  | Souder et al. ......................... 1/1 |
| 6,233,585 | B1 | * | 5/2001 | Gupta et al. ......................... 1/1 |
| 6,240,414 | B1 | * | 5/2001 | Beizer et al. ......................... 1/1 |
| 6,643,652 | B2 | * | 11/2003 | Helgeson et al. ..................... 1/1 |
| 6,971,096 | B1 | * | 11/2005 | Ankireddipally et al. .... 718/101 |
| 2003/0055828 | A1 | * | 3/2003 | Koch et al. ...................... 707/10 |
| 2004/0088712 | A1 |   | 5/2004 | Hickson et al. |
| 2005/0091658 | A1 |   | 4/2005 | Kavalam et al. |
| 2005/0125430 | A1 | * | 6/2005 | Souder et al. ................. 707/100 |

OTHER PUBLICATIONS

Dayal, U. et al., "Business Process Coordination: State of the Art, Trends, and Open Issues," Proceedings of the 27$^{th}$ VLDB Conference, Roma, Italy 2001, 11 pages.

* cited by examiner

*Primary Examiner* — Tarek Chbouki
(74) *Attorney, Agent, or Firm* — Hickman Palermo Truong Becker Bingham Wong LLP

(57) ABSTRACT

Techniques are provided for extending a business transaction framework to support user-provided compensation logic for business transactions. The extensibility framework may be used to implement user-defined semantics for (a) validating concurrent updates to shared data and (b) performing compensating actions when an associated transaction is aborted. In one embodiment, the extensibility and the compensation are provided at the data-type level. User-provided logic also maintains summaries that include values that are externalized so that they may be referenced in user-provided operational constraints.

42 Claims, 4 Drawing Sheets

SUPPORT FOR COMPENSATION AWARE DATA TYPES IN RELATIONAL DATABASE SYSTEMS

PRIORITY CLAIM

The present application claims priority as a continuation-in-part of U.S. patent application Ser. No. 12/102,831, filed Apr. 14, 2008 now U.S. Pat. No. 7,904,434, entitled "FRAMEWORK FOR HANDLING BUSINESS TRANSACTIONS" (hereinafter the "BUSINESS TRANSACTION APPLICATION"), which claims priority to U.S. Provisional Application No. 60/972,557, filed Sep. 14, 2007 entitled "FUNCTIONAL SPECIFICATION FOR BUSINESS TRANSACTION, RDBMS, 11.2". The entire contents of each of which are incorporated herein by reference.

FIELD OF THE INVENTION

The present invention relates to extending a business transaction framework to support custom compensation rules.

BACKGROUND

In a traditional database system, the transaction management protocols and mechanisms are constrained by the fundamental properties of atomicity, consistency, isolation and durability (ACID). The transaction atomicity, which is the cornerstone of a transaction management system, states that a transaction either runs completely or has no effect on the system at all. The atomicity property indirectly impacts a transaction's ability to view the effects of another transaction while it is executing (visibility) and the database system's ability to recover in case of a failure (recoverability).

In a typical database system, a transaction's ability to view another transaction's uncommitted data is controlled using read locks or multi-version read consistent views of data. Write locks protect a transaction's uncommitted data from being seen and modified by some other transaction. These write locks are held until the end of the transaction and this is required to ensure that the system is recoverable.

A transaction management system with strict ACID properties is effective for conventional database applications involving short execution times (short transactions) and relatively small number of concurrent transactions (operating on the same data). However, it is excessively restrictive for applications that involve reactive, long-lived, and complex transactions.

For example, a complex transaction may involve making the arrangements for a band's world tour. Such arrangements may involve booking many flights, hotels, arranging car rentals, dining, etc. Completing all of the arrangements may take weeks. If the entire "world tour" transaction is modeled using a single database transaction, then certain records may remain locked to other transactions for the entire duration. For example, a record that indicates how many seats are available on a particular flight may remain locked (preventing other passengers from booking seats on the same flight) until the "world tour" transaction either commits or fails.

Keeping records locked for the duration of complex business transactions is impractical and inefficient. However, if a complex business transaction is modeled using several independent database transactions, other problems may occur. For example, assume that a part of a particular business transaction involves increasing the funds in an account. Further assume that the fund increase operation is performed as a distinct database transaction that is allowed to commit before the entire business transaction completes. After the fund increase transaction commits, other transactions are able to see the increased funds in the account. One of those other transactions may be a "withdrawal" transaction that withdraws more funds from the account than existed in the account prior to the funds increase.

If the business transaction that performed the funds increase does not complete successfully, then it will be difficult to undo the changes made by the partially-performed business transaction. In the current example, decreasing the funds of the account to undo the fund increase will leave the account with a negative balance, due to the subsequent withdrawal transaction. To avoid a negative balance, the withdrawal transaction may have to be undone before the fund update transaction is undone. Undoing the withdrawal transaction may necessitate the rollback of one or more additional transactions that relied on the changes made by the withdrawal transaction. Situations like this, where aborting one transaction may necessitate aborting one or more subsequent transactions, are known as "cascading abort" situations.

The Business Transactions Application describes various techniques for freeing up resources before the business transactions that change the resources have successfully completed. According to one embodiment described therein, resources are freed up by committing database transactions that perform portions of operations before the operations themselves have successfully completed. If the operations fail to complete successfully, then "compensation information" is used to remove the effects of the committed changes that were performed as part of the operation. The compensation information indicates the relative effect of the committed changes, so that the relative effect of the changes can be removed without removing the effect of changes made to the resource by subsequent transactions. Because the effect of changes made to the resource by subsequent transactions is not undone, application of the compensation information does not result in a cascading abort situation.

The Business Transactions Application also describes various techniques for allowing database transactions to update values without retaining exclusive locks on those values. Consequently, even before a first transaction that changed a value commits, a second transaction is allowed to change the same value. If the first transaction fails to commit, the effect of changes made by the first transaction are removed by applying compensation information. The application of the compensation information removes only the effects of the changes of the first transaction.

As explained in the Business Transactions Application, a business transaction in the real world is often long lasting, discontinuous, distributed and is able to resume after a system failure. Examples for such business transactions include Travel Reservations, Inventory Management and Provisioning. On the other hand, a database transaction in an RDBMS is typically short lived (to avoid deadlocks and issues with low concurrency), completed within a single thread and is lost in the case of a system failure (assuming the transaction did not commit before the failure). In the absence of a business transaction framework within a database system, business transaction logic is often implemented in the application-tier outside the database system due to this mismatch between a business transaction and a database transaction.

When business transactions are implemented in the application tier, each interaction with an information system (database) is typically modeled using a separate database transaction so that the locks on the modified resources are only held for the duration of the database transaction. Each business transaction has one or more database transactions associated with it. Even though the database transactions are committed, from the business transaction point-of-view, the operations performed on the information systems are considered unconfirmed until the business transaction itself is committed.

Unlike traditional database transactions, which hold the write locks on some modified data until the end of the transaction, a business transaction modeled in the application-tier relinquishes the locks much before the end of the transaction. Hence, concurrent business transactions modify the common data while retaining the effects of other unconfirmed business transactions. To support shared updates to common data (with proper validation) applications often keep track of state information pertaining to each on-going business transaction. When the business transaction is aborted, the same state information is used to generate meaningful compensating operations to undo the effects of a specific transaction while keeping the other transactions intact. The compensation logic is application dependent and is often hand-coded to meet business needs.

The Business Transaction Application describes a framework to manage long-running business transactions in the database. Under this framework, the database server maintains the lifecycle of business transactions and the state pertaining to each business transaction. The framework also supports commonly-used compensation mechanisms as data classification mechanisms—MEASURE and CATEGORY, and the ability to express the compatibility tests for concurrent operations on common data items as declarative operational constraints.

Unfortunately, the pre-built data classification mechanisms (MEASURE and CATEGORY) proposed by the Business Transaction framework may prove too restrictive for a wide range of applications needing custom compensation logic. If applications need compensation logic that does not match the pre-built data classification mechanisms provided by the business transaction framework, applications are forced to revert to using database transactions as surrogates for the business transactions, thus tying up resources for extended durations, as described above. Alternatively, the business transaction logic may still be implemented in the application-tier. Such implementations are often plagued with inefficiencies and/or higher cost of management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
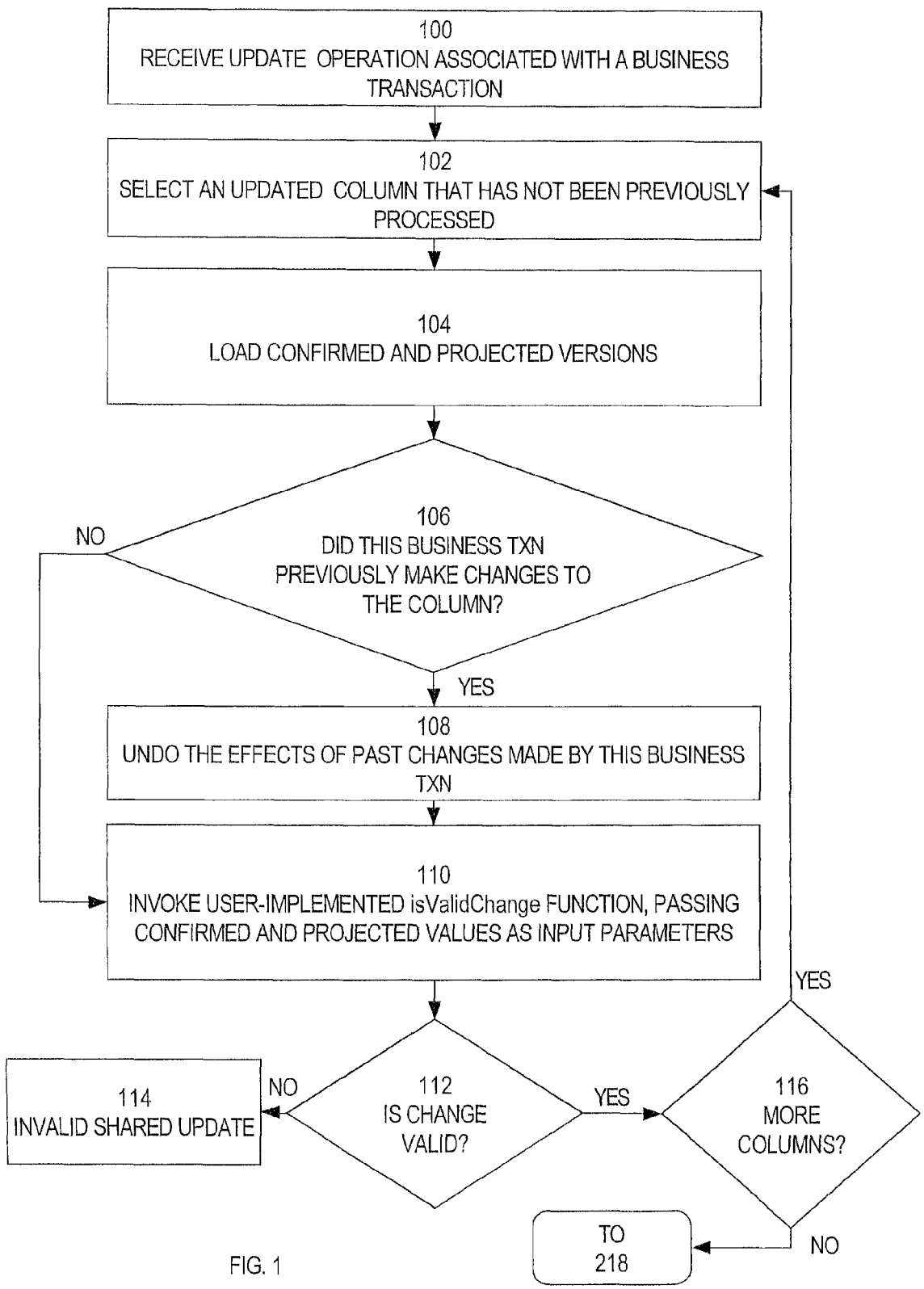
FIG. 1 is a flowchart illustrating steps performed on each updated column to determine whether the update is valid based on user-provided update-validation logic, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for extending the business transaction framework (described in the Business Transaction Application) to support user-provided compensation logic for business transactions. The extensibility framework described herein may be used to implement user-defined semantics for (a) validating concurrent updates to shared data and (b) performing compensating actions when an associated transaction is aborted. In one embodiment, the extensibility and the compensation are provided at the data-type level.

Shared Updates

The Business Transaction Application introduced the concept of shared updates. Shared updates allow concurrent business transactions to perform updates to common data without holding exclusive locks on the data for the duration of the business transactions.

A transaction's ability to perform shared updates is determined by the semantics of the data being updated. For example, a field maintaining the current capacity of a flight can be updated by concurrent business transactions as long as the resulting value (for all possible outcomes of the unconfirmed business transactions) is within the valid range.

The exact semantics that determine the shared update behavior for a data type are 1) the ability to test the compatibility of each incoming UPDATE request with those that are already performed (and pending for confirmation) on the same data instance and 2) the ability to undo a specific UPDATE operation without reverting to cascading aborts. For the earlier example, if a modification to the capacity field is measured in terms of the quantity of change (instead of absolute values before and after the modification), a specific reservation request can be undone, with no impact on other concurrent operations, by simply negating the quantity of change.

The Abstract Data Classification Type

According to one embodiment, columns containing traditional database data types are made "compensation aware" by associating shared update semantics with the specific usages of that data type. For example, assume that the capacity column in a reservation table is configured with NUMBER data type. To allow escrow-like operations (simultaneous increments and decrements by concurrent transactions) on this NUMBER column, additional semantics are associated with the column using an extensibility framework. The shared update semantics for a data type can be defined using the Business Transaction extensibility framework described herein.

According to one embodiment, an abstract data classification (ADC) type with specific methods for performing various business transaction-related operations is defined. According to one embodiment, the ADC type includes methods for:

validating an update operation in the presence of other concurrent operations, computing the compensated value for a specific UPDATE operation, and confirming the effects of an UPDATE operation.

Customized Data Classification Types

Because the ADC type is an abstract data type, the ADC type specifies the interface, but not the logic, for these methods. To support a particular type of compensation, users create customized data classification (CDC) types by extending the ADC type and implementing its methods. Thus, the methods of CDC types contain classification-specific code to implement the logic for:

validating an update operation in the presence of other concurrent operations, computing the compensated value for a specific UPDATE operation, and confirming the effects of an UPDATE operation.

For example, a user may extend the ADC type to create a CDC type named "EscrowType" to support escrow-like shared update operations. The EscrowType CDC type shall be used in various examples hereafter. However, EscrowType is merely one example of a CDC type that may be created by users to implement customized compensation semantics. There is no limit to the compensation-type or semantics that a user may implement using the extensible framework described herein.

Attaching Compensation-Aware Semantics

Once a CDC type 302 has been defined by a user, the semantics of the CDC type must be associated with the column(s) to which those semantics are to be applied. In one approach (referred to herein as the "attachment approach"), programmatic interfaces are provided to attach the semantics of CDC types with columns that are defined as having a native data type (NUMBER, VARCHAR2 etc.). For example, consider the following code:

```
CREATE TABLE Flights    (flightId      NUMBER,
                         origDate      DATE
                         currCapacity  NUMBER);
begin
   dbms_btx.assign_su_semantics (table_name   => 'Flights',
                                 column_name  => 'currCapacity',
                                 data_class   => EscrowType( ));
end;
```

In this code sample, the CREATE TABLE statement specifies the creation of a table "Flights" with three columns: flightID, origDate, and currCapacity. The flightID, origDate, and currCapacity columns are associated with the native data types NUMBER, DATE, and NUMBER, respectively.

Before the dbms_btx.assign_su_semantics function is called, customized compensation semantics have not been attached to any of the columns of the Flights table. However, in response to the call to the dbms_btx.assign_su_semantics function, the database server attaches to the column specified in the function call the semantics of the CDC type specified in the function call. In this example, the database server would respond to the call to dbms_btx.assign_su_semantics by attaching to the currCapacity column of the Flights table the compensation-aware semantics defined in the EscrowType CDC type.

Attaching compensation-aware semantics to columns in this manner allows existing applications to enable shared updates on the shared data with no data migration. Specifically, the compensation-aware semantics are attached without changing the underlying data type of the column (i.e. the data type of the currCapacity column continues to be NUMBER).

Encapsulating Compensation-Aware Semantics

Instead of or in addition to using the attachment approach, a compensation-aware data type can be modeled as an object type that extends the base type with specific interfaces. In this approach (referred to herein as the "encapsulation approach"), the data for which the shared updates should be allowed is encapsulated within the data classification object type implementation, which is in turn inherited from a base type.

For example, the EscrowType object type may include a generic capacity attribute, which stores the capacity for some resource. With this approach, the above Flights table may be defined as follows to allow shared updates on corresponding columns. The following code illustrates a call to create a Flight table in which the currCapacity column is defined as an EscrowType column.

```
CREATE TABLE Flights (flightId       NUMBER, origDate  DATE,
                      currCapacity   EscrowType);
```

Much of the discussion hereafter assumes that the attachment approach is used to establish a loose coupling between the table columns and the corresponding data classification type. However, the concepts described herein are applicable to both approaches.

Shared Updates with a CDC Type

Shared updates in the database are performed within the context of a business transaction. The Business Transaction framework maintains some metadata for each shared update operation, which is in turn used to validate subsequent update requests to the same field, as well as compensate for the original operation in case of the transaction abort. The exact metadata maintained for each update operation, and its usage (for validation and compensation), are user programmable with a specific implementation of the ADC type.

A CDC type has an associated ADC type. The ADC type has specific methods to perform maintenance operations for significant events in the lifecycle of a business transaction. The CDC type provides user-customized logic for those methods. According to one embodiment, the ADC type has the following methods:

isValidChange
prepJournalRecord
confirmUpdate
abortUpdate
isSupportedDatatype

A new CDC type may be defined by extending the base ADC type and providing logic for implementing these methods. Each of these methods, and the circumstances in which they are invoked by the Business Transaction framework, shall be described in greater detail hereafter.

The isValidChange Method

Once the mapping between a CDC type and a column is established, the business transaction framework invokes the isValidChange method to validate an update operation that attempts to modify a value stored in the corresponding compensation-aware column.

The isValidChange method has access to other concurrent changes to the same value, and the implementer of the CDC type may rely on this information to check if the current update operation is compatible with concurrent (shared update) operations.

The prepJournalRecord Method

Upon successful validation of an Update operation (which could perform changes to multiple columns), the business transaction framework invokes the prepJournalRecord method for each modified column to prepare the necessary metadata for the shared update operation. The metadata returned by the prepJournalRecord method is stored in the Business Transaction journal for subsequent operations.

The implementer of the CDC type can also maintain incremental summaries for concurrent shared update operations to a specific value, and make these summaries part of the metadata maintained in the Business Transaction journal. The summaries computed here are accessible in the method validating the UPDATE operation (isValidChange method) as well as in the declarative operational constraints, which can perform cross-column validations for each shared update operation.

The confirmUpdate Method

When a business transaction confirms, all the associated shared update operations are considered confirmed. The confirmUpdate method is invoked to perform some housekeeping operations on the journal, to adjust any summaries maintained for the shared updates. The confirmUpdate method allows application-specific journal maintenance operations at the time of transaction confirmation.

The abortUpdate Method

The abortUpdate method is invoked by the framework for each shared update operation associated with a business transaction that is currently aborting. The abortUpdate method, in addition to making necessary journal maintenance operations, computes the compensated value for the specific data modification that is being aborted and returns this value to the business transaction framework. The framework uses these compensated values to make necessary changes to the table data.

The isSupportedDatatype Method

When a CDC type is associated with a table column to enable shared updates using the attachment approach, the type implementation and the table column should agree on the data type for the values. For example, an EscrowType implementation is only applicable to columns of INTEGER data type (and possibly FLOAT and DOUBLE data types). The Business Transaction framework enforces such restrictions by invoking the isSupportedDatatype method while associating the shared update semantics with a specific table column.

Validating Update Operations

Using the framework and techniques described herein, the validation of an UPDATE operation can be done in a variety of ways, including: 1) Programmatic approach with isValidChange method, and 2) Declarative approach with operational constraints.

As explained in the Business Transaction Application, operational constraints are conditional expressions that should evaluate to true for any update operation on a specific column to succeed. The operational constraints are expressed using multiple versions of data, namely current, confirmed, and projected, for the impacted table row.

According to one embodiment, these values are accessed within the operational constraints using pseudo variable extended column names. For the purpose of discussion, it shall be assumed that the pseudo variable names for the current, confirmed and projected values are, respectively: btx_current.currCapacity, btx_confirmed.currCapacity, and btx_projected.currCapacity.

An extensible data classification implementation maintains the confirmed and projected version for the corresponding data through all the business transaction operations (with appropriate logic in prepJournalRecord, confirmUpdate, and abortUpdate methods). These values can be referenced in the operational constraints using extended names.

While the isValidChange method validates the update operation based exclusively on the column data (current change, past changes to the same column value, and any computed summaries), the operational constraints can be used to enforce cross-column validations. For instance, when currCapacity and maxCapcity are two columns in the same table, an operational constraint "btx_projected.currCapacity<btx_confirmed.maxCapacity" may be specified for the currCapacity column, in which case, the validation for the update operation is based on a multi-column constraint.

Externalizing Summaries

According to one embodiment, summaries computed within a CDC type 302 are externalized so that user-provided logic of the operational constraints may make reference to the summaries. In one embodiment, the summaries are externalized using one or more operators configured with the type. Each operator has a name, data type information, and a mapping to the entry in the journal.

For example, an EscrowType implementation may choose to compute (a) the sum of all value increments, and (b) the sum of all value decrements, as summaries. Under these circumstances, two operators BTX_ESCROW_INCR and BTX_ESCROW_DECR may be defined to externalize the summaries as numerical data. With this configuration, an operational constraint may be defined as follows:

btx_current.currCapacity between (minCapacity+
        BTX_ESCROW_INCR (currCapacity)) and
        (maxCapacity+BTX_ESCROW_DECR (currCapacity))

The above operational constraint ensures that shared updates to the currCapacity column are allowed as long as all possible outcomes of the outstanding business transaction leave the value within a range defined in the minCapacity and maxCapacity columns in the same row.

Mutable Updates

The projected version of a column value is the value that includes the effects of all concurrent shared update operations on the data. In most cases, this is also the value stored in the corresponding table column. For example, an Update operation on a column configured for Escrow semantics changes the value stored in the column by a specific amount and also maintains the magnitude of change in the business transaction journals. The projected value in this case is [confirmed value+ sum of all increments−sum of all decrements to the value], which is the actual value stored in the table column. But in some rare cases, the projected value could be different from any value that is specifically set by an Update operation. For instance, a Multi-level security application may use a lattice structure to define the valid data transformation for shared update operations. Such a security application may stipulate, for example, that the projected value for a set of operations is the supremum of all the unconfirmed changes.

To allow such data classification methodologies, the extensible framework described herein supports a mutable update option for the extensible type implementation. A mutable update option allows a new computed value to be written to the table column at the time of a shared update. When this option is used, the prepJournalRecord method, while processing an update operation initiated by the end user, may determine that the value to be stored in the table column is different from the value set by the last operation and returns this new value to the business transaction framework. The framework in turn overwrites the value set by the current update operation with the value returned by the custom implementation.

The Business Transaction Journal

The Business Transaction framework maintains the journal information for all on-going shared update operations in a persistent table. This journal information facilitates additional row specific (shared updates to the same row by other transactions) and business transaction specific operations (confirm or abort). In one embodiment, the journal table has one entry for each column value that has at least one shared update by a business transaction. This entry summarizes the effect of all the shared updates to a specific value (nth column of mth row in a specific table) and it minimally has the confirmed and projected versions for the value in encoded AnyData format. The AnyData format allows any SQL value, of a native type or a user-defined type, to be marshaled into AnyData instance and stored in a uniform structure. The journal entry additionally stores any incremental summaries computed by the prepJournalRecord method for a specific data classification implementation.

In addition to the journal entry that summarizes the effects of all shared updates to a column value, each shared update operation on the value has a transaction-specific entry in the journal table. This too is returned by the prepJournalRecord method and is used to perform transaction specific operations - make additional changes to the same value, confirm the transaction, and abort the transaction. Repeated changes to the same value within a single business transaction are collapsed into a single transaction specific entry that captures the net-effect of all the changes. For example, two separate Update operations within a business transaction may decrement the value in a specific capacity column by two and then by three, resulting in a journal entry that indicates that the transaction has decremented the capacity by 5. In this example, the Escrow type implementation defined the net-effect as the sum of all the current change and any past change.

The logic used for consolidating the requests is application dependent (and is programmed into the prepJournalRecord method). An alternate implementation may choose to override the earlier request (for decrementing the value by two) with the new request (decrement the value by three). The prepJournalRecord implementation may also choose to maintain summaries/effects for transaction-specific journal entries to facilitate the net-effect computation.

Journal-Related Methods

In one embodiment, in addition to the methods described above, the ADC type has a few static methods to provide secure access to the journal entries that may be relevant for extensible type implementations. For example, if a CDC type's shared update semantics rely on the order in which the concurrent Update operations are performed, then the journal entry for the operation that immediately precedes a specific operation can be accessed using a getPrevJournalRecord method.

Other static methods available for journal maintenance operations include getNextJournalRecord and deleteJournalRecord. The deleteJournalRecord method is applicable when the confirmation of a specific update operation automatically invalidates other journal entries. For instance, for time-ordered compensation mechanism, in which a last update operation that is confirmed prevails over all other concurrent changes, the deleteJournalRecord method may be used to delete the journal entries corresponding to the operations that precede the update operation that is being confirmed.

Business Transaction Framework and CDC Type Interactions

Figure 2:
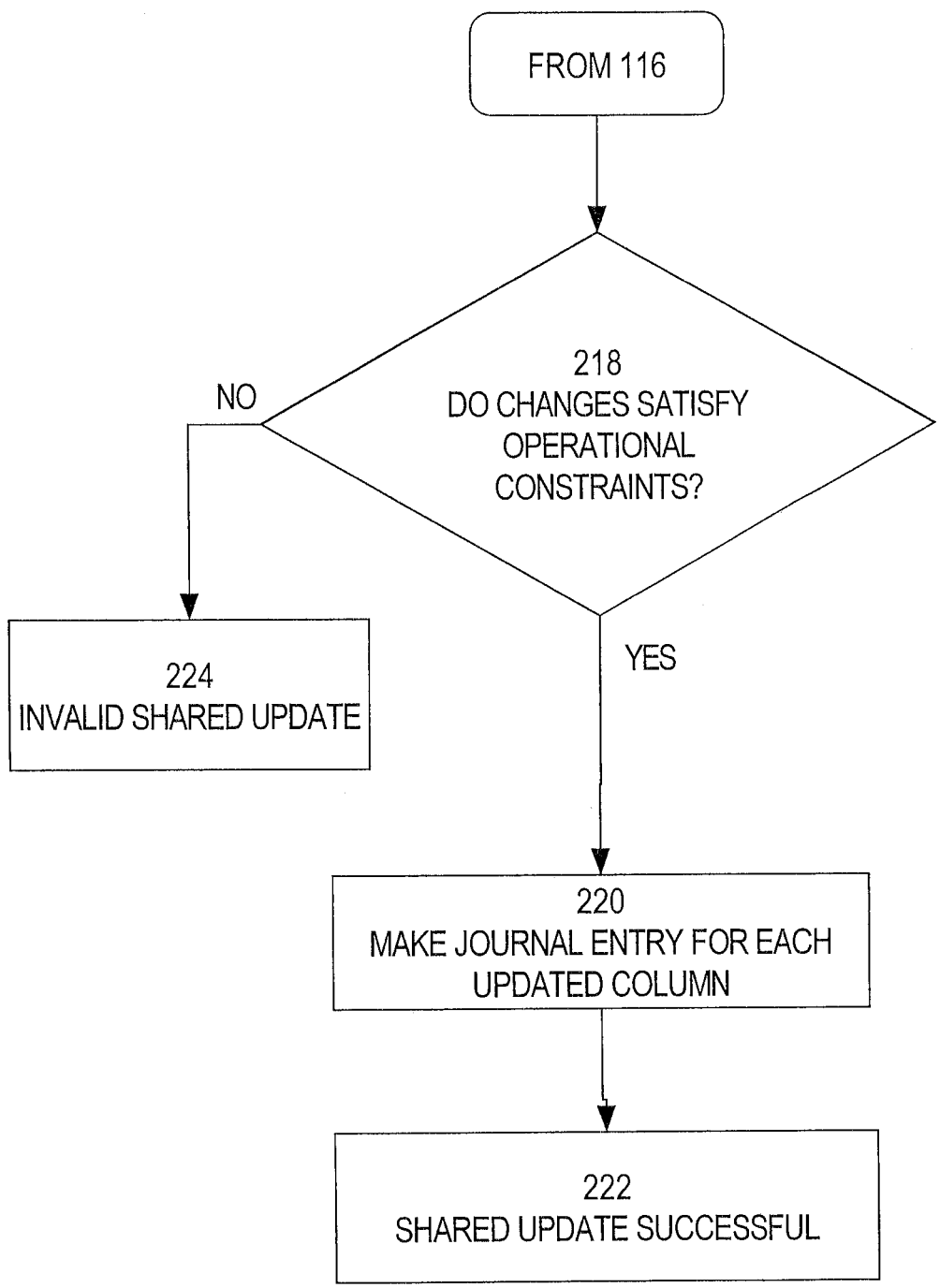
FIG. 2 is a flowchart illustrating steps for determining whether operational constraints are satisfied based on user-provided constraint-checking logic, according to an embodiment of the invention.
Figure 3:
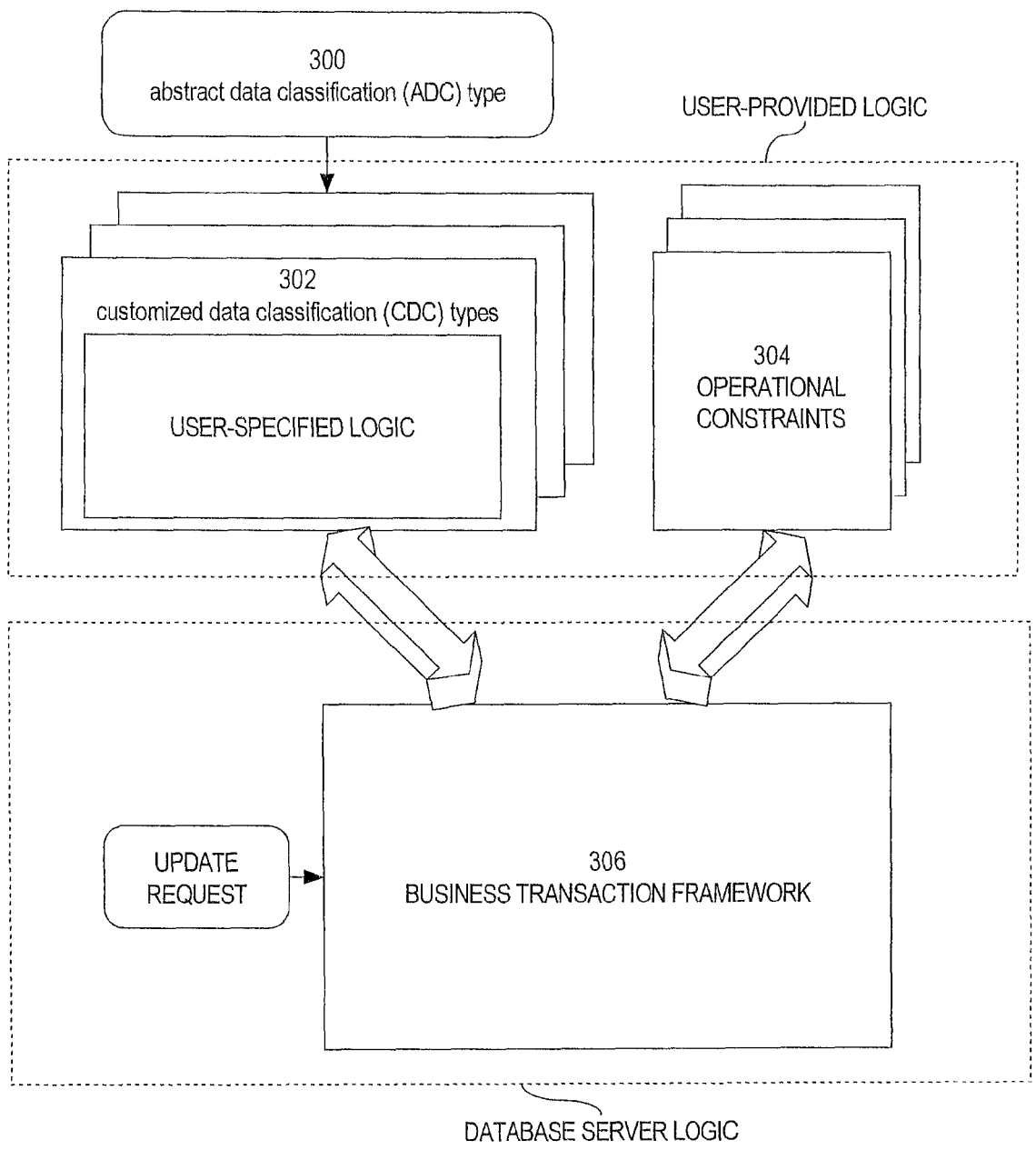
FIG. 3 is a block diagram illustrating an extensible business transaction platform according to an embodiment of the invention.

FIGS. 1 and 2 are flowcharts that illustrate interactions between the business transaction framework and the (Extensible) CDC types during an update operation, according to an embodiment of the invention. FIG. 3 is a block diagram illustrating a business transaction framework 306 and the CDC types 302 that may be involved in that interaction. As illustrated in FIG. 3, the CDC types 302 may be different implementations of the same abstract data classification type 300.

As explained above, a table enabled for business transactions may have distinct data classification methodologies associated with each column in the table. In general, during a standard update operation, which modifies a subset of the columns in the table, the corresponding CDC types 302 are used to validate the operation, as well as prepare the journal entries.

Referring to FIG. 1, at step 100 the business transaction framework 306 intercepts an Update operation on a table enabled for business transactions. For the purpose of discussion, the business transaction that is attempting to make the intercepted update is referred to herein as the "requesting business transaction". This interception may be performed in a variety of ways, including using a BEFORE ROW trigger, or with an integrated kernel implementation.

In one embodiment, the update statements intercepted by the business transaction framework 306 employ standard SQL. Thus, database applications that submit SQL against tables that have columns to which CDC type semantics have been attached need not be modified to change the syntax of the database commands that the applications send to the database server.

Steps 102 to 116 define a loop that iterates over each column modified by the intercepted Update operation. At step 104, the business transaction framework 306 gathers the confirmed and projected versions of the value that is being updated in the current column. In gathering this information, if the column value being updated has prior shared updates, the business transaction framework 306 loads the confirmed value and the projected value from the business transaction journals. If this update is the first shared update operation to this specific column, then the confirmed and projected values are set to the pre-update copy of the column value. As explained in the Business Transaction Application, the confirmed version of a value reflects all changes made by confirmed business transactions, and does not reflect any changes made by unconfirmed business transactions. The projected version of the value, on the other hand, reflects changes made by other not-yet-confirmed business transactions.

At step 106, the business transaction framework 306 determines whether the updating business transaction has previously updated the value in the current column. If the updating business transaction has not previously updated the value in the current column, then control passes to step 110.

On the other hand, if the updating business transaction has previously updated the value in the current column, then in step 108 the business transaction framework 306 invokes an undoChange method in the CDC type 302 for the column being processed to undo the past changes by the same transaction. The undoChange method adjusts the projected version of the column, which now excludes the effects of past changes to the value made by the requesting business transaction.

The effects of prior updates made by the updating business transaction are removed from the projected version at this point so that the validity determination may be made based on the net change that the updating business transaction is attempting to make to the value in the column. For example, if the updating business transaction previously reserved five seats on a flight, then released four seats on the flight, and is now attempting to reserve five more seats on the flight, then the "net change" of all changes made by the business transaction on the particular value is reserving six seats.

Consequently, the validation determination should be based on whether reserving six seats is permissible given the confirmed value of the column and the possible outcomes resulting from changes on the column made by other, unconfirmed business transactions. Once the effects of the past changes of the updating business transaction have been undone, control passes to step 110.

At step 110, the business transaction framework 306 invokes the isValidChange method in the CDC type 302 to validate the current shared update operation. All the necessary information (e.g. the confirmed value, the projected value, and the net change requested by the requesting transaction) is passed by the business transaction framework 306 into the isValidChange method. If the isValidChange method returns false, then control passes from step 112 to step 114, and the current update operation is considered to conflict with other shared update operations and an error is raised. Otherwise, the business transaction framework 306 checks to see if there are any updated columns that have not yet been processed 116.

If at step 116 there are any updated columns that have not yet been processed, then control passes back to step 102, causing the next updated column to be processed. If all updated columns have been processed and every call to isValidChange has returned TRUE, then, control passes to step 218 (shown in FIG. 2).

Referring to FIG. 2, at step 218 the business transaction framework 306 uses the information loaded into the run-time state during steps 104-108 to evaluate the operational constraints 304 (if any) associated with the columns being modified. As explained above, the operational constraints 304 enforce cross-column dependencies to validate the shared update operation. If at least one operational constraint 304 fails, control passes to step 224 where an error is raised and the current update operation is restricted. As mentioned above, various operators such as BTX_ESCROW_INCR and BTX_ESCROW_DECR may be externalized so that users may construct declarative statements that reference values externalized from the summaries.

If at step 218 no operational constraint fails, then at step 220 the business transaction framework 306 invokes the prepJournalRecord method for each updated column, and makes/adjusts the journal entries based on the values returned by the user-provided logic. At step 222, the shared update operation is deemed compatible with other concurrent operations and the update is successful.

Note that, in one embodiment, the database server already validates integrity constraints before the business transaction framework 306 takes control in Step 100. So, violations with Uniqueness, Check (Not null etc), and referential constraints are handled before the Step 100.

Business Transaction Confirm Operation

When a business transaction with one or more successful shared updates is confirmed, the framework consults with the extensible implementations and makes necessary changes to the journal entries. For example, in one embodiment, the business transaction framework 306 ensures that the confirmed versions for the values touched by the business transaction reflect the effects of confirming the transaction.

In one embodiment, in response to a confirm operation, the business transaction framework 306 invokes the confirmChange methods for all the corresponding CDC types 302 to make use of the user-defined logic for computing the new confirmed value. The business transaction framework 306 passes to the confirmChange method the information pertaining to the transaction-specific journal entry, as well as the journal entry maintaining the confirmed, projected and other summary values. The implementer of the CDC type 302 can make use of this information to record the effects of current operation in its confirmed, projected and summary values. The journal table is updated with these new values for the summary journal entry and the transaction-specific journal entry is deleted.

Business Transaction Abort Operation

When a business transaction is aborted, the effects of all the shared updates performed within the transaction should be undone. The process of undoing the effects of an aborted business transaction is called "compensation". The implementer of the CDC type 302 determines the exact compensation logic based on the semantics of the data, as well as other shared updates that are currently active in the system. The business transaction framework 306 invokes the undoChange method in the CDC type 302 to get the user-computed compensated value, and makes necessary changes to the dictionary and the base table to undo the effects of the transaction.

The isValidChange Method and Operational Constraints

Operational constraints and the isValidChange Method serve similar purposes. Specifically, both incorporate user-specified logic to determine whether updates made by a business transaction should be allowed. However, isValidChange differs from operational constraints in that the logic of an isValidChange implementation is specific to a CDC type. The isValidChange logic is attached to a particular column by assigning the CDC type to the column. In contrast, an operation constraint is defined on a per-column basis, and is not necessarily associated with any particular CDC type.

Because isValidChange implementations and operational constraints are both mechanisms for determining whether updates made by business transactions are valid based on user-provided logic, in some situations only one or the other may be sufficient. Consequently, in one embodiment, the isValidChange method is an "optional" method of a CDC type. If operational constraints make all of the necessary checks to determine whether an update by a business transaction is valid, then the user need not implement the isValidChange method. If the user has not provided an implementation of the isValidChange method, then the framework does not call the isValidChange method in step 108.

On the other hand, if all of the checking that needs to be done to determine whether changes may be made to values in a particular column is performed by the isValidChange implementation of the CDC type assigned to the column, then the user need not define any operational constraints on the column. Under these circumstances, at step 208 in FIG. 2, there are no operational constraints for the business transaction framework to evaluate.

Pseudo Code for Escrowtype Implementation

In the following sections, various pseudo code examples are given of how a user might actually design a CDC type 302 for use with the business transaction framework 306 described herein. However, it should be noted that the syntax, operators, etc. used in these examples are merely exemplary. The actual language, format, and syntax for defining a CDC type 302 may vary from implementation to implementation.

For the purpose of illustration, the pseudo-code illustrates how a user may specify the logic for an implementation of the EscrowType CDC type. The EscrowType is used to enable shared updates to a column storing numerical data.

In the implementation depicted in the following pseudo-code, the numerical data is assumed to be type casted into strings and passed in as arguments to the type implementation. Alternately, the numerical data marshaled as AnyData instances can be passed in. This implementation can be used to control shared updates to capacity columns by defining cross-column dependencies (e.g: maxCapacity column).

A missing isValidChange method from the specific type implementation indicates that type specific checks are always true, and the shared updates are validated using only operational constraints. The type implementation also externalizes the summary information computed within the type using two operators BTX_ESCROW_DECR and BTX_ESCROW_INCR.

```
create or replace type EscrowType extends btx$dataclass as
    /** set the properties for the extensible type implementation **/
    member function getProperties return btxsys.btx$datacprop is
    begin
        -- create the mapping between the summary maintained by the
        -- the type implementation and the external operators --
        return btxsys.btx$datacprop(
                        className => 'Escrow ADC type',
                        firstAuxOper => 'btx_escrow_decr',
                        firstOperTyp => 'number',
                        firstOperDfvl => '0',
                        secondAuxOper => 'btx_escorw_incr',
                        secondOperTyp => 'number',
                        secondOperDfvl => '0');
    end;
    /** restrict the type to specific SQL data types for enabling   **
    ** shared updates                                               **/
    member function isSupportedDatatype (
                        dataType        VARCHAR2,
                        dataTypeOwner   VARCHAR2) return NUMBER is
    begin
        if (dataTypeOwner is null and
            dataType in ('INTEGER', 'NUMBER', 'FLOAT')) then
            return 1;
        else
            return 0;
        end if;
    end isSupportedDatatype;
    /** prepare journal record based on the information passed in **/
    member procedure prepJournalRecord (
                        updValue     IN OUT VARCHAR2,
                        updOptV1     IN OUT VARCHAR2,
                        updOptV2     IN OUT VARCHAR2,
                        confValue    IN     VARCHAR2,
                        projValue    IN OUT VARCHAR2,
                        auxOperV1    IN OUT VARCHAR2,
                        auxOperV2    IN OUT VARCHAR2) is
        chng NUMBER;
    begin
        chng := to_number(updValue)-to_number(projValue);
        -- the net change by the current operation is maintained
```

```
    -- in the optional value maintained for the individual
    -- journal record --
    updOptV1 := to_char(chng);
    if (chng < 0) then
      -- sum of all decrements --
      auxOperV1 = to_char(to_number(auxOperV1)-chng);
    else
      -- sum of all increments --
      auxOperV2 := to_char(to_number(auxOperV2)+chng);
    end if;
    projValue := updValue;
  end prepJournalRecord;
  /** confirm a specific update to a value. Maintain the   **
   ** journal values to include the effects of tx confirm  **/
  member procedure confirmChange (
                          updIdent       IN VARCHAR2,
                          updValue       IN VARCHAR2,
                          updOptV1       IN VARCHAR2,
                          updOptV2       IN VARCHAR2,
                          confValue      IN OUT VARCHAR2,
                          projValue      IN OUT VARCHAR2,
                          auxOperV1      IN OUT VARCHAR2,
                          auxOperV2      IN OUT VARCHAR2) is
    chng NUMBER;
  begin
    chng := to_number(updOptV1); -- positive or negative --
    -- adjust the summaries maintained for the value --
    if (chng < 0) then
      auxOperV1 := to_char(to_number(auxOperV1)+chng);
    else
      auxOperV2 := to_char(to_number(auxOperV2)-chng);
    end if;
    -- confirmed value will be decremented if a negative
    -- change and vice versa --
    confValue := to_char(to_number(confValue)+chng);
  end confirmChange;
  /** undo the specific update to a value. Maintain the   **
   ** journal entries accordingly                          **/
  member procedure undoChange (
                          updIdent       VARCHAR2,
                          compValue      IN OUT VARCHAR2,
                          updOptV1       VARCHAR2,
                          updOptV2       VARCHAR2,
                          confValue      VARCHAR2,
                          projValue      IN OUT VARCHAR2,
                          auxOperV1      IN OUT VARCHAR2,
                          auxOperV2      IN OUT VARCHAR2) is
    chng NUMBER := to_number(updOptV1);
  begin
    projValue := to_char(to_number(projValue)-chng);
    -- compensated value; value to be set for the base row --
    compValue := projValue;
    -- adjust the summaries maintained for the value --
    if (chng < 0) then
      auxOperV1 := to_char(to_number(auxOperV1)+chng);
    else
      auxOperV2 := to_char(to_number(auxOperV2)-chng);
    end if;
    -- confirmed value does not change when an operation is
    -- aborted. --
  end undoChange;
end EscrowType;
```

Conclusion

Using the Business Transaction framework extensions described herein, existing database applications can be enabled for shared updates by associating additional semantics to the columns in the table. No application changes are required, as standard DML syntax is used to manipulate the data stored in relational tables. Domain experts can implement the shared update semantics for specific types of data, which can be plugged into the business transaction framework.

In addition, the levels of concurrency between update operations from concurrent transactions are determined using pre-programmed and/or declarative compatibility checks. The compatibility checks for shared updates are clearly divided into 1) those that have no external dependencies and 2) those that need external dependencies. The compatibility checks that do not need external dependencies are implemented as part of the extensible CDC type. The cross column compatibility checks are made possible by externalizing summaries computed by the CDC type. The extensibility framework allows user-defined data classification methodologies, which define the data semantics and the compensation logic, to be plugged into the Business transaction framework.

Hardware Overview

Figure 4:
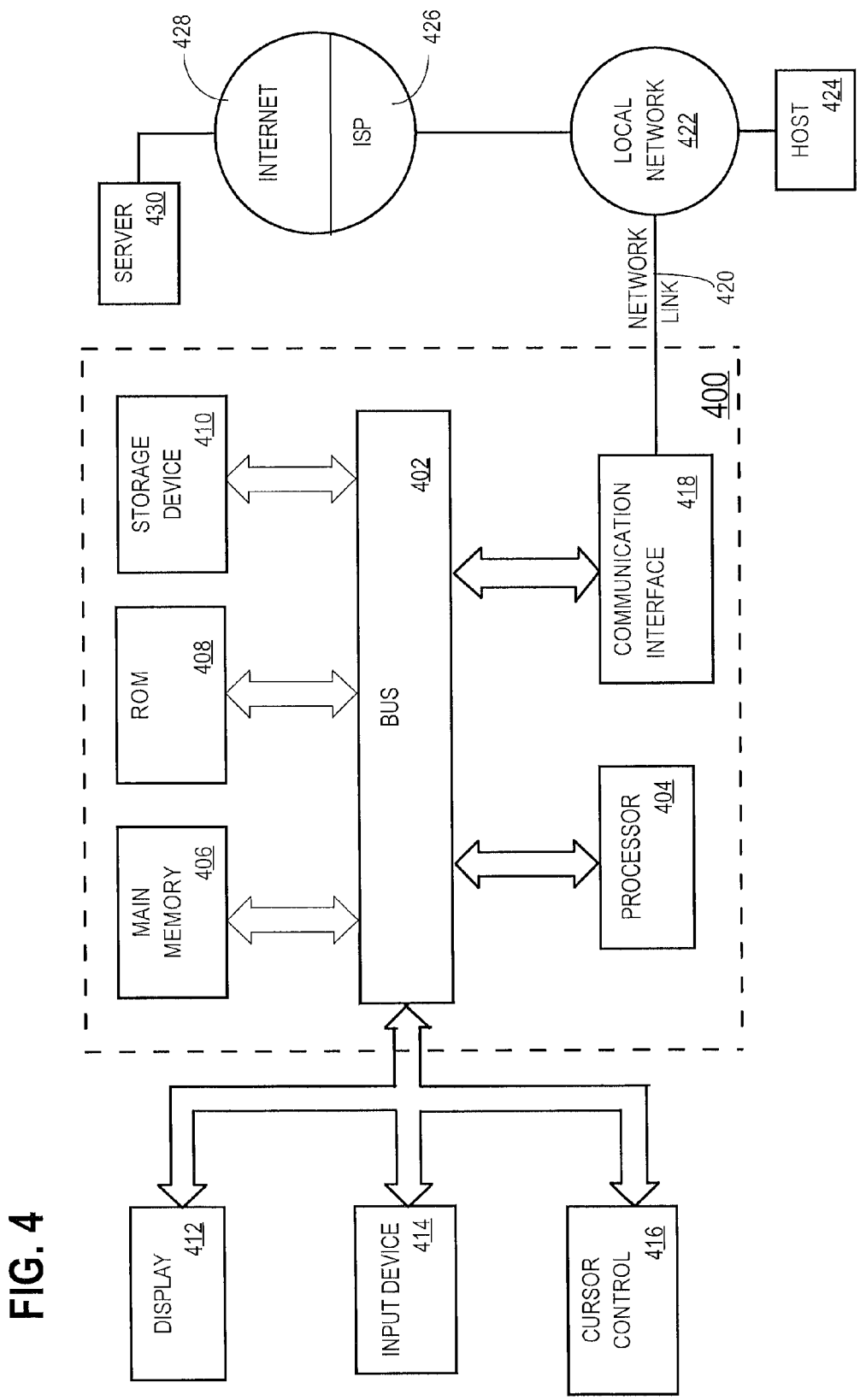
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing shared updates, comprising:
receiving user-provided logic for determining whether updates to a particular column are valid in the presence of concurrent updates to data items in the particular column;
storing the user-provided logic at a location accessible to a business transaction framework;
wherein the user-provided logic is distinct and separate from the business transaction framework;
receiving a request, associated with a particular business transaction, to perform an update to a particular copy of a data item in a particular row in the particular column;
wherein the particular copy of the data item has a value that has been updated by
updates, made by one or more business transactions other than the particular business transaction, that have not yet been confirmed, and
updates, made by the particular business transaction, previous to receiving the request, that have not yet been confirmed; and
in response to the request, the business transaction framework performing the steps of:
(a) determining, for the particular copy of the data item, a particular value, wherein the particular value is a current value of the particular copy of the data item;
(b) causing the user-provided logic to generate an indication of whether the update should be allowed, in the presence of concurrent updates to the particular copy of the data item, by:
invoking the user-provided logic, and
passing, to the user-provided logic, said particular value to enable the user-provided logic to determine whether the update should be allowed based, at least in part, on the particular value, and one or more constraints on the value of the data item;
(c) determining whether to allow the update based, at least in part, on the indication;
wherein the step of receiving user-provided logic includes receiving at least one of:
an implementation of a method of a customized data classification type; or a definition of an operational constraint that includes logic for enforcing cross-column dependencies;
wherein the method is performed by at least one device comprising a processor.

2. A non-transitory computer-readable storage medium storing one or more sequences of instructions which, when executed by one or more processors, causes the one or more processors to perform steps comprising:
receiving user-provided logic for determining whether updates to a particular column are valid in the presence of concurrent updates to data items in the particular column;
storing the user-provided logic at a location accessible to a business transaction framework;
wherein the user-provided logic is distinct and separate from the business transaction framework;
receiving a request, associated with a particular business transaction, to perform an update to a particular copy of a data item in a particular row in the particular column;
wherein the particular copy of the data item has a value that has been updated by
updates, made by one or more business transactions other than the particular business transaction, that have not yet been confirmed, and
updates, made by the particular business transaction, previous to receiving the request, that have not yet been confirmed; and
in response to the request, the business transaction framework performing the steps of:
(a) determining, for the particular copy of the data item, a particular value, wherein the particular value is a current value of the particular copy of the data item;
(b) causing the user-provided logic to generate an indication of whether the update should be allowed, in the presence of concurrent updates to the particular copy of the data item, by:
invoking the user-provided logic, and
passing, to the user-provided logic, said particular value to enable the user-provided logic to determine whether the update should be allowed based, at least in part, on the particular value, and one or more constraints on the value of the data item;
(c) determining whether to allow the update based, at least in part, on the indication;
wherein the step of receiving user-provided logic includes receiving at least one of:
an implementation of a method of a customized data classification type; or a definition of an operational constraint that includes logic for enforcing cross-column dependencies.

3. A method for performing shared updates, comprising:
receiving user-provided logic for determining whether updates to a particular column are valid in the presence of concurrent updates to a same value;
storing the user-provided logic at a location accessible to a business transaction framework;
receiving a request, associated with a particular business transaction, to perform an update to a value in the particular column; and
in response to the request, the business transaction framework performing the steps of:
(a) determining a projected value for the value in the particular column
(b) causing the user-provided logic to generate an indication of whether the update should be allowed, in the presence of concurrent updates to the same value, by:
invoking the user-provided logic, and
passing, to the user-provided logic, said projected value to enable the user-provided logic to determine whether the update should be allowed based, at least in part, on the projected value and one or more constraints on the value of the particular column;
(c) determining whether to allow the update based, at least in part, on the indication;
wherein the step of receiving user-provided logic includes receiving at least one of:
an implementation of a method of a customized data classification type; or a definition of an operational constraint that includes logic for enforcing cross-column dependencies;

wherein the method is performed by at least one device comprising a processor.

4. The method of claim 3 wherein:
the step of invoking the user-provided logic includes making a call to the implementation of the method of the customized data classification type.

5. The method of claim 3 wherein:
the step of invoking the user-provided logic includes evaluating the operational constraint.

6. The method of claim 5 wherein the operational constraint references values externalized from summaries maintained by third user-provided logic.

7. The method of claim 3 further comprising, prior to invoking the user-provided logic, invoking second user-provided logic to undo past changes to said value in the particular column that were made by the business transaction.

8. The method of claim 3 further comprising determining a net change based on all changes made by the business transaction to said value of the particular column.

9. The method of claim 3 further comprising, in response to determining that the update is allowed, performing the steps of:
invoking second user-provided logic which prepares metadata for the update operation; and
storing the metadata returned by the second user-provided logic in a business transaction journal for subsequent operations.

10. The method of claim 3 further comprising:
receiving an indication that the business transaction confirmed; and
in response to the indication, invoking second user-provided logic to compute a new confirmed value for the value; and
storing the new confirmed value in a journal table.

11. The method of claim 3 further comprising:
receiving an indication that the business transaction aborted; and
in response to the indication, invoking second user-provided logic to obtain a compensated value; and
using the compensated value to undo effects of the business transaction.

12. The method of claim 3 wherein:
the user-defined logic includes logic for both shared update validation and for maintaining metadata through transaction abort and confirm; and
the user-defined logic is encapsulated into an extensible data type implementation, which is associated with a field/column that receives shared update requests.

13. A method for performing shared updates, comprising:
receiving user-provided logic for determining whether updates to a particular column are valid in the presence of concurrent updates to a same value;
storing the user-provided logic at a location accessible to a business transaction framework;
receiving a request, associated with a particular business transaction, to perform an update to a value in the particular column; and
in response to the request, the business transaction framework performing the steps of:
(a) determining a confirmed value for the value in the particular column
(b) causing the user-provided logic to generate an indication of whether the update should be allowed, in the presence of concurrent updates to the same value, by:
invoking the user-provided logic, and
passing, to the user-provided logic, said confirmed value to enable the user-provided logic to determine whether the update should be allowed based, at least in part, on the confirmed value and one or more constraints on the value of the particular column;
(c) determining whether to allow the update based, at least in part, on the indication;
wherein the step of receiving user-provided logic includes receiving at least one of:
an implementation of a method of a customized data classification type; or a definition of an operational constraint that includes logic for enforcing cross-column dependencies;
wherein the method is performed by at least one device comprising a processor.

14. The method of claim 13 wherein:
the step of invoking the user-provided logic includes making a call to the implementation of the method of the customized data classification type.

15. The method of claim 13 wherein:
the step of invoking the user-provided logic includes evaluating the operational constraint.

16. The method of claim 15 wherein the operational constraint references values externalized from summaries maintained by third user-provided logic.

17. The method of claim 13 further comprising, prior to invoking the user-provided logic, invoking second user-provided logic to undo past changes to said value in the particular column that were made by the business transaction.

18. The method of claim 13 further comprising determining a net change based on all changes made by the business transaction to said value of the particular column.

19. The method of claim 13 further comprising, in response to determining that the update is allowed, performing the steps of:
invoking second user-provided logic which prepares metadata for the update operation; and
storing the metadata returned by the second user-provided logic in a business transaction journal for subsequent operations.

20. The method of claim 13 further comprising:
receiving an indication that the business transaction confirmed; and
in response to the indication, invoking second user-provided logic to compute a new confirmed value for the value; and
storing the new confirmed value in a journal table.

21. The method of claim 13 further comprising:
receiving an indication that the business transaction aborted; and
in response to the indication, invoking second user-provided logic to obtain a compensated value; and
using the compensated value to undo effects of the business transaction.

22. The method of claim 13 wherein:
the user-defined logic includes logic for both shared update validation and for maintaining metadata through transaction abort and confirm; and
the user-defined logic is encapsulated into an extensible data type implementation, which is associated with a field/column that receives shared update requests.

23. A non-transitory computer-readable storage medium storing one or more sequences of instructions which, when executed by one or more processors, causes the one or more processors to perform steps comprising:
receiving user-provided logic for determining whether updates to a particular column are valid in the presence of concurrent updates to a same value;

storing the user-provided logic at a location accessible to a business transaction framework;

receiving a request, associated with a particular business transaction, to perform an update to a value in the particular column; and in response to the request, the business transaction framework performing the steps of:

(a) determining a projected value for the value in the particular column (b) causing the user-provided logic to generate an indication of whether the update should be allowed, in the presence of concurrent updates to the same value, by: invoking the user-provided logic, and passing, to the user-provided logic, said projected value to enable the user-provided logic to determine whether the update should be allowed based, at least in part, on the projected value with one or more other values and one or more constraints on the value of the particular column; (c) determining whether to allow the update based, at least in part, on the indication; wherein the step of receiving user-provided logic includes receiving at least one of: an implementation of a method of a customized data classification type; or a definition of an operational constraint that includes logic for enforcing cross-column dependencies.

24. The non-transitory computer-readable storage medium as recited in claim 23, wherein:

the step of invoking the user-provided logic includes making a call to the implementation of the method.

25. The non-transitory computer-readable storage medium as recited in claim 23, wherein:

the step of invoking the user-provided logic includes evaluating the operational constraint.

26. The non-transitory computer-readable storage medium as recited in claim 25, wherein the operational constraint references values externalized from summaries maintained by third user-provided logic.

27. The non-transitory computer-readable storage medium as recited in claim 23, further storing one or more sequences of instructions which, when executed by the one or more processors, causes the one or more processors to perform steps comprising: prior to invoking the user-provided logic, invoking second user-provided logic to undo past changes to said value in the particular column that were made by the business transaction.

28. The non-transitory computer-readable storage medium as recited in claim 23, further storing one or more sequences of instructions which, when executed by the one or more processors, causes the one or more processors to perform steps comprising: determining a net change based on all changes made by the business transaction to said value of the particular column.

29. The non-transitory computer-readable storage medium as recited in claim 23, further storing one or more sequences of instructions which, when executed by the one or more processors, causes the one or more processors to perform steps comprising:

invoking second user-provided logic which prepares metadata for the update operation; and storing the metadata returned by the second user-provided logic in a business transaction journal for subsequent operations.

30. The non-transitory computer-readable storage medium as recited in claim 23, further storing one or more sequences of instructions which, when executed by the one or more processors, causes the one or more processors to perform steps comprising:

receiving an indication that the business transaction confirmed; and in response to the indication, invoking second user-provided logic to compute a new confirmed value for the value; and storing the new confirmed value in a journal table.

31. The non-transitory computer-readable storage medium as recited in claim 23, further storing one or more sequences of instructions which, when executed by the one or more processors, causes the one or more processors to perform steps comprising:

receiving an indication that the business transaction aborted; and in response to the indication, invoking second user-provided logic to obtain a compensated value; and using the compensated value to undo effects of the business transaction.

32. The non-transitory computer-readable storage medium as recited in claim 23, wherein:

the user-defined logic includes logic for shared update validation and for maintaining metadata through transaction abort and confirm; and the user-defined logic is encapsulated into an extensible data type implementation, which is associated with a field/column that receives shared update requests.

33. A non-transitory computer-readable storage medium storing one or more sequences of instructions which, when executed by one or more processors, causes the one or more processors to perform steps comprising:

receiving user-provided logic for determining whether updates to a particular column are valid in the presence of concurrent updates to a same value;

storing the user-provided logic at a location accessible to a business transaction framework;

receiving a request, associated with a particular business transaction, to perform an update to a value in the particular column; and in response to the request, the business transaction framework performing the steps of:

(a) determining a confirmed value for the value in the particular column (b) causing the user-provided logic to generate an indication of whether the update should be allowed, in the presence of concurrent updates to the same value, by: invoking the user-provided logic, and passing, to the user-provided logic, said confirmed value to enable the user-provided logic to determine whether the update should be allowed based, at least in part, on comparing the confirmed value and one or more constraints on the value of the particular column;

(c) determining whether to allow the update based, at least in part, on the indication;

wherein the step of receiving user-provided logic includes receiving at least one of:

an implementation of a method of a customized data classification type; or a definition of an operational constraint that includes logic for enforcing cross-column dependencies.

34. The non-transitory computer-readable storage medium as recited in claim 33, wherein:

the step of invoking the user-provided logic includes making a call to the implementation of the method.

35. The non-transitory computer-readable storage medium as recited in claim 33, wherein:

the step of invoking the user-provided logic includes evaluating the operational constraint.

36. The non-transitory computer-readable storage medium as recited in claim 35, wherein the operational constraint references values externalized from summaries maintained by third user-provided logic.

37. The non-transitory computer-readable storage medium as recited in claim 33, further storing one or more sequences of instructions which, when executed by the one or more processors, causes the one or more processors to perform steps comprising: prior to invoking the user-provided logic, invoking second user-provided logic to undo past changes to said value in the particular column that were made by the business transaction.

38. The non-transitory computer-readable storage medium as recited in claim 33, further storing one or more sequences of instructions which, when executed by the one or more processors, causes the one or more processors to perform steps comprising:
 determining a net change based on all changes made by the business transaction to said value of the particular column.

39. The non-transitory computer-readable storage medium as recited in claim 33, further storing one or more sequences of instructions which, when executed by the one or more processors, causes the one or more processors to perform steps comprising:
 invoking second user-provided logic which prepares metadata for the update operation; and
 storing the metadata returned by the second user-provided logic in a business transaction journal for subsequent operations.

40. The non-transitory computer-readable storage medium as recited in claim 33, further storing one or more sequences of instructions which, when executed by the one or more processors, causes the one or more processors to perform steps comprising:
 receiving an indication that the business transaction confirmed; and
 in response to the indication, invoking second user-provided logic to compute a new confirmed value for the value; and
 storing the new confirmed value in a journal table.

41. The non-transitory computer-readable storage medium as recited in claim 33, further storing one or more sequences of instructions which, when executed by the one or more processors, causes the one or more processors to perform steps comprising:
 receiving an indication that the business transaction aborted; and
 in response to the indication, invoking second user-provided logic to obtain a compensated value; and
 using the compensated value to undo effects of the business transaction.

42. The non-transitory computer-readable storage medium as recited in claim 33, wherein:
 the user-defined logic includes logic for shared update validation and for maintaining metadata through transaction abort and confirm; and
 the user-defined logic is encapsulated into an extensible data type implementation, which is associated with a field/column that receives shared update requests.

* * * * *

UNITED STATES PATENT AND TRADEMARK OFFICE
CERTIFICATE OF CORRECTION

| | |
|---|---|
| PATENT NO. | : 8,566,296 B2 |
| APPLICATION NO. | : 12/270790 |
| DATED | : October 22, 2013 |
| INVENTOR(S) | : Yalamanchi |

It is certified that error appears in the above-identified patent and that said Letters Patent is hereby corrected as shown below:

In the Specification

Column 15, line 6, delete "V1 =" and insert -- V1 := --, therefor.

Signed and Sealed this
Third Day of June, 2014

Michelle K. Lee
*Deputy Director of the United States Patent and Trademark Office*